E. ANDERSON.
MACHINE TOOL.
APPLICATION FILED JULY 5, 1918.

1,408,428.

Patented Mar. 7, 1922.

Inventor
Emil Anderson
by Marshall A. Dearborn, Atty.

E. ANDERSON.
MACHINE TOOL.
APPLICATION FILED JULY 5, 1918.

1,408,428.

Patented Mar. 7, 1922.
7 SHEETS—SHEET 4.

Inventor
Emil Anderson
By
Marshall C Dearborn
Attorneys

E. ANDERSON.
MACHINE TOOL.
APPLICATION FILED JULY 5, 1918.

1,408,428.

Patented Mar. 7, 1922.

Inventor
Emil Anderson
by Marshall O Dearborn, Atty.

UNITED STATES PATENT OFFICE.

EMIL ANDERSON, OF NEW YORK, N. Y., ASSIGNOR TO MULTIPLEX TOOL COMPANY, INC., OF NEW YORK, N. Y., A CORPORATION OF NEW YORK.

MACHINE TOOL.

1,408,428.   Specification of Letters Patent.   Patented Mar. 7, 1922.

Application filed July 5, 1918. Serial No. 243,273.

*To all whom it may concern:*

Be it known that I, EMIL ANDERSON, a citizen of the United States of America, and a resident of New York, county and State of New York, have invented certain new and useful Improvements in Machine Tools, of which the following is a specification, reference being had to the accompanying drawings, forming a part thereof.

My invention relates to machine tools, and its object it to provide a single apparatus by means of which machining operations may be performed which heretofore have required the use of several machines.

Another object is to provide a machine which is so arranged that the cutting tool may be adjusted into every desired position, to thereby increase the capability of the machine for accomplishing many different kinds of work.

Another object is to provide a machine by means of which various operations may be accomplished upon one piece of work without resetting the work, thus saving time and avoiding the difficulties of accurate resetting.

A further object is to provide a wide range of spindle speed.

In order that my invention may be thoroughly understood I will now proceed to describe the same in the following specification and will then point out the novel features thereof in appended claims.

Referring to the drawings.

Like characters of reference designate corresponding parts in all the figures.

30 designates the bed of the machine and 31 a table slidable on tracks on the bed. 32—32 are side frames extending upwardly from the bed and connected at the top by a portion 33. 34 is a transverse shaft driven alternately by oppositely running belts 35 and arranged through gearing on an intermediate shaft 36, to rotate a bull wheel 37 which engages a toothed rack 38 on the under side of the table 31 to reciprocate the table. 39—39 are dogs attached to the table and arranged to engage a tappet 40 to actuate a belt shifter (not shown) through a rod 41 to reverse the movement of the table.

42 is a friction disc on shaft 36 with an extending arm 43 which limits the rotation of the disc by striking against stops 44. 45 is a block in transverse guides on the disc 42, the eccentricity of which block relative to the axis of shaft 36 may be adjusted by a screw 46. 47 is a connecting rod between block 45 and a reciprocatory rack 48 vertically guided in one of the side frames 32, the stroke of which is varied by setting the eccentricity of the block 45.

A gear 49 on shaft 50 engages the rack 48 and reciprocates another gear 51 and a gear 52 with which it meshes. A pawl 53 which moves with gear 52 engages a ratchet wheel 54 on a threaded feed shaft 55, the end of which is squared for manual adjustment. 56 is the cross rail vertically adjustable on the side frames 32 and on which the tool head 60 slides transversely. The tool head has threads with which the shaft 55 engages so that rotation of feed shaft 55 produces transverse movement of the tool head. The vertical adjustment of the cross rail is accomplished by vertical screws 57—57 which pass through threaded parts of the cross rail and which are geared to a manually actuated cross shaft 58.

61 is a guide plate adjustably secured to the tool head by bolts 62, which plate carries the tool slide 63 which may be adjusted manually by means of a screw 64. All of the parts so far described specifically are common to former planer construction.

For the purpose of increasing the adaptability of the machine, it is desirable to provide for the slow movement of the table 31. For this purpose a shaft 70 is provided near the top of the machine, with a cone pulley 71 on one of its ends by means of which it may be driven, and with a pulley 72 on its other end. Splined to this shaft are bevel gears 73 which may be shifted by a lever 74 to bring one or the other of them into driving engagement with another bevel gear 75 affixed to the upper end of a vertical shaft 76. A worm wheel 77 near the lower end of shaft 76 meshes with a gear 78 loosely mounted on shaft 34. 79 is a clutch member splined to shaft 34 and moved thereon by a hand lever 80.

By disengaging the driving connection for the belts 35 and throwing the clutch member 79 into engagement with the gear 78, the rotation of shaft 70 may be transmitted to the bull wheel 37 at greatly reduced speed to effect a slow movement of the table 31, the direction of which may be changed by means of the lever 74. The shaft 70 is belt connected in this case to a power driven countershaft 81.

82 is a worm held between brackets 83 on the cross rail and splined to the vertical shaft 76. This meshes with a worm gear 84 loosely mounted on shaft 50 on which is affixed the gear 49. The shaft 50 may be moved axially by a lever 85 to move gear 49 out of engagement with the rack 48 and into engagement with the inside of the gear 84 which is provided with internal teeth or projections 86 by means of which these gears 49 and 84 may be locked together. By means of this arrangement the feed screw 55 may be driven from the vertical shaft 76 through the pawl 53 and ratchet wheel 54. It is obvious that this rotation of the feed screw may be accomplished either in conjunction with or independently of the movement of the table 31.

I have described the guide plate 61 as connected with the tool head 60 by bolts 62 as in former planer practice.

In order to provide for an automatic feed for the tool slide 63, a bevel gear 66 is fixed to the screw 64. With it meshes a bevel gear 67 the hub of which is concentric with the circular groove 65 and to which is affixed another bevel gear 68 in mesh with a similar gear 69 inside of the cross rail 56 and splined to a shaft 87 connected by gears 88—89, the latter fast to shaft 87 to be driven from gear 52. For this purpose another pawl 90 connected to move with gear 52 is arranged to be brought into engagement with a ratchet wheel 91 which is loose on shaft 55, but rigidly connected with gear 88 which is also loose on the shaft 55. The gear 52 is mounted to rotate freely on the hub between ratchet wheel 91 and gear 88. This is the usual means for transmitting the movement of the gear 52 to either the horizontal feed screw 55 or the vertical feed screw 64, or to both of them. 92 is the usual pin for moving the bevel gear 69 into or out of engagement with a bevel gear 68.

Figures 7, 8:
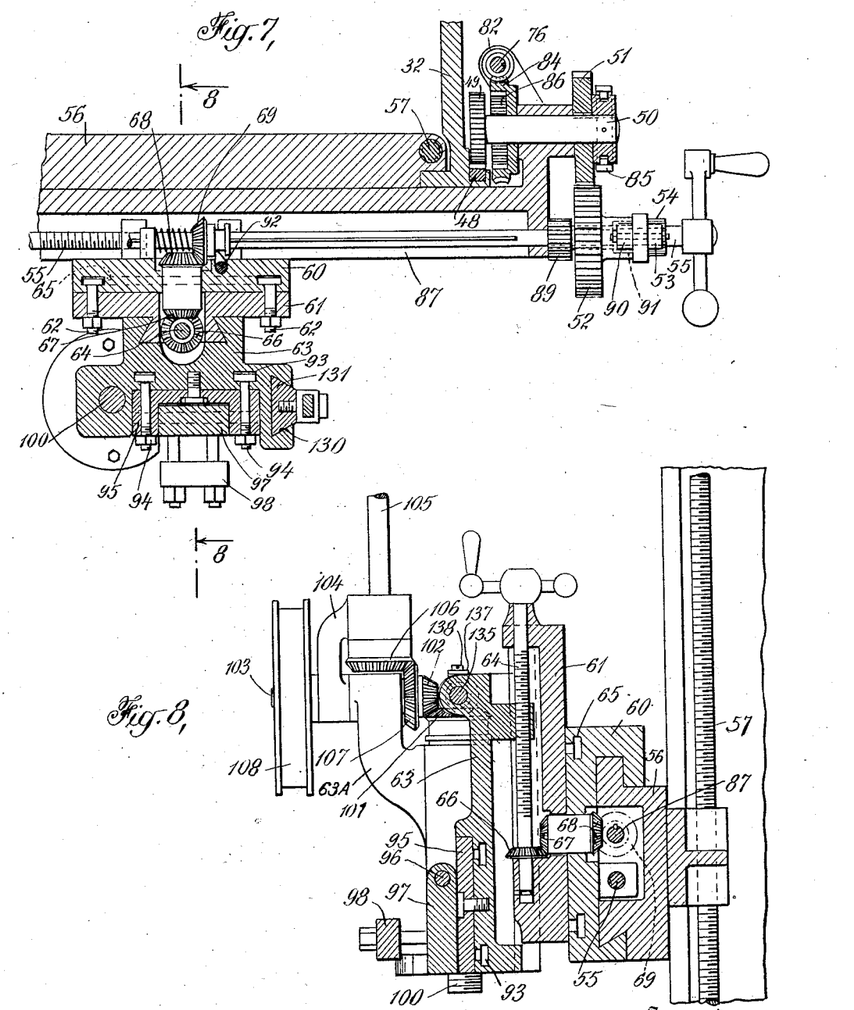
Figure 7 is an enlarged sectional plan view on the line 7—7 of Figure 3.
Figure 8 is a sectional side elevation on the line 8—8 of Figure 7.

In the tool slide 63 is another circular undercut groove 93 (Figs. 7 and 8) for the reception of the heads of bolts 94 which adjustably support a plate 95. 96 is a pivot by means of which the yoke 97 which carries the planer tool clamp 98, is supported by plate 95. 99 designates a planer tool.

100 is a rotary spindle in the tool slide 63. 101 is a bevel gear affixed to the upper end thereof, in mesh with a part 102 of a double bevel gear on a short shaft 103, journaled in a bracket 63$^A$ projecting forwardly from the tool slide 63. 104 is a yoke rotatively supported on shaft 103 and forming a bearing for the lower end of a drive shaft 105. On the lower end of this drive shaft is affixed a bevel gear 106 which meshes with the other part 107 of the double bevel gear. A pulley 108 is affixed to the outer end of shaft 103.

The drive shaft 105 runs up through a yoke 110 which is pivotally supported on the countershaft 81. A bevel gear 111 splined to drive shaft 105 meshes with a similar gear 112 on the end of the countershaft. By this arrangement the spindle 100 is driven by the countershaft 81 and provision is made for the transverse, vertical and rotative adjustments of the tool slide without interference with this transmission mechanism.

Figure 1:
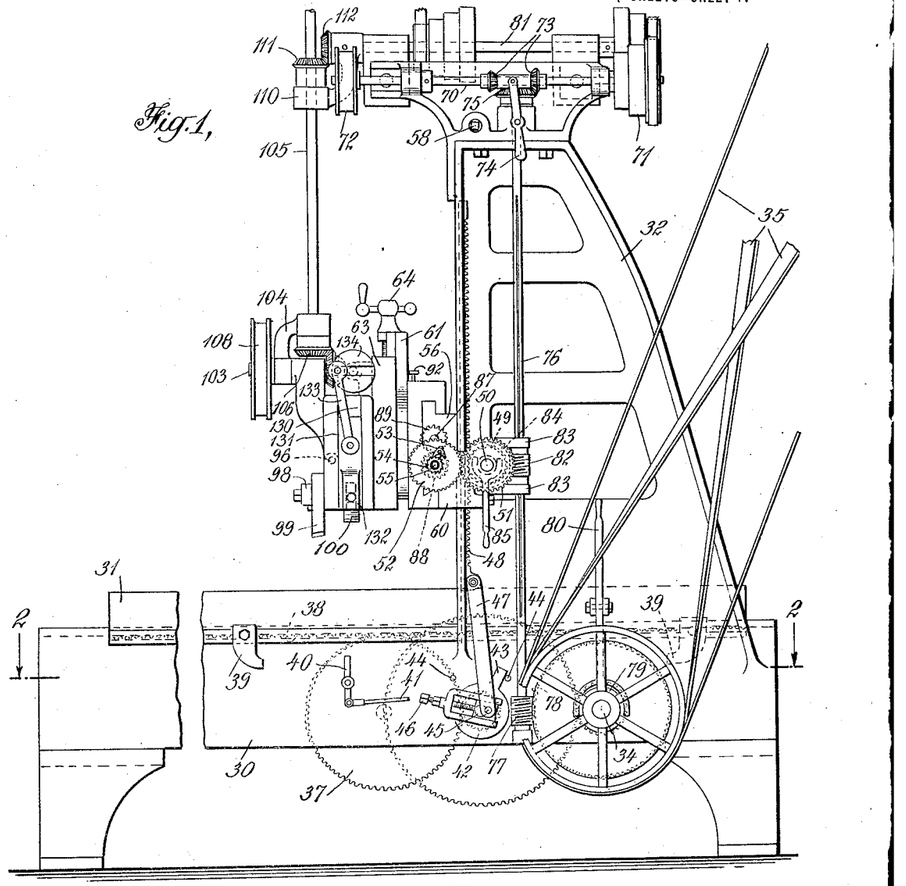
Figure 1 is a side elevation of a planer with certain mechanisms attached thereto which embody this invention.
Figure 2:
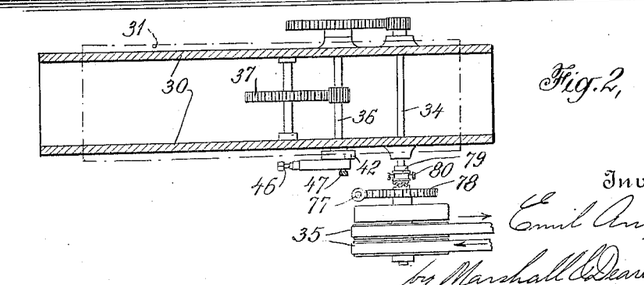
Figure 2 is a plan view, partly in section, of the machine shown in Figure 1, on a smaller scale, the section being taken on the line 2—2 of the latter figure.
Figures 3, 4, 5:
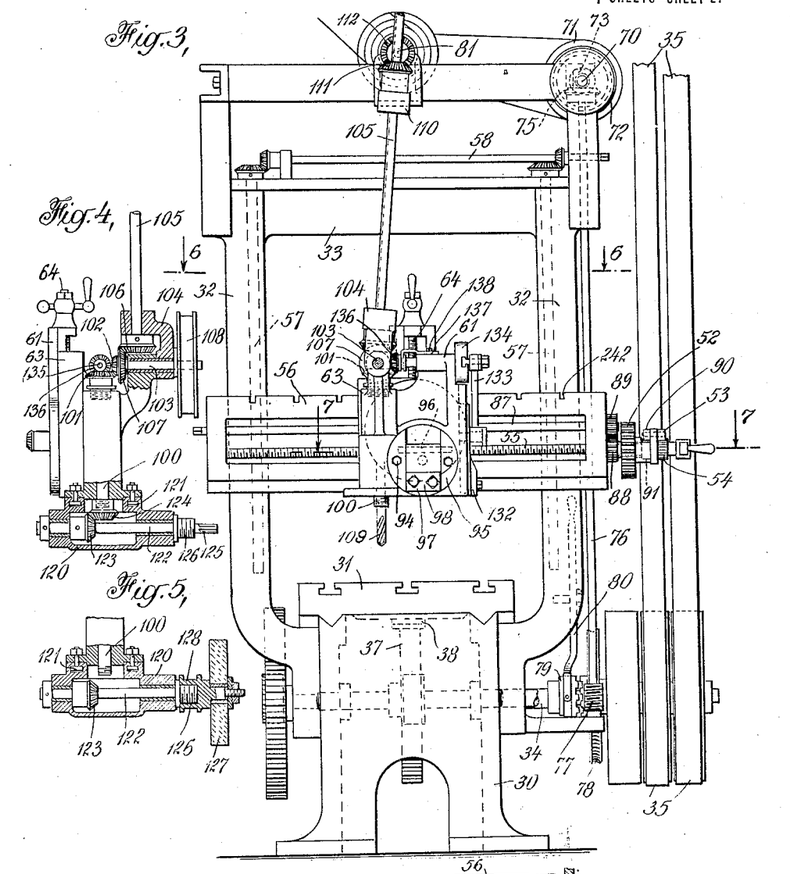
Figure 3 is a front elevation of the machine shown in Figure 1.
Figure 4 is a side elevation, partly in section, of the tool head shown in Figure 1, with a horizontal tool holder affixed thereto, the view being taken from the opposite side from that of Figure 1, on the line 4—4 of Figure 6.
Figure 5 is a sectional side elevation of the tool holder shown in Figure 4, illustrating the manner in which it is used for supporting a grinding wheel instead of a cutting tool.

In Figure 3, a drill 109 is shown inserted in the spindle 100. 120 (Figs. 4, 5 and 17) is a housing having a circular undercut groove 121 by means of which it may be adjustably attached to a flange at the lower end of the tool slide. This housing forms bearings for a shaft 122 to which is affixed a bevel gear 123. The spindle 100 is arranged to receive a bevel gear 124 to drive shaft 122. In Fig. 4 an end mill 125 is shown inserted in a socket at the end of shaft 122.

The end of shaft 122 is enlarged at 126 to receive the hub of a grinding wheel 127 as shown in Fig. 5. This hub is constructed to form a pulley 128 by means of which the shaft 122 may be driven by a belt 129 from pulley 108. In such case the bevel gear 124 is omitted.

On the side of tool slide 63 are guides 130 for a reciprocatory tool holder 131 which is provided near its lower end with a clamp 132 for holding a slotting tool. 133 is a connecting rod between this tool holder and a disc 134 in the face of which is a transverse slot for the pivot pin for the upper end of the connecting rod so that the eccentricity may be adjusted to vary the stroke of the slotting tool. The disc 134 is on one end of a shaft 135 rotatively supported in the tool slide 63 and a bevel gear 136 is splined to this shaft and so arranged that it may be moved into mesh with the bevel gear 101 to effect a driving engagement between drive shaft 105 and shaft 135. A strap 137 is provided for giving gear 136 its axial movement and a bolt 138 serves to hold it in place.

In Figures 9–16 a modified construction is shown for the slow drive of the table and tool head feed and for driving the spindle and slotter on the tool slide. The adjustable support for the tool slide is also of different construction.

Referring now to these figures 140 is a power driven transverse shaft supported at the top of the side frames 32. Near one of its ends are splined spaced bevel gears 141 either one of which may be moved by a lever 142 into engagement with a bevel gear 143 affixed to the upper end of a vertical shaft 144. On the other end of this vertical shaft is a bevel gear 145 into mesh with which may be thrown by a lever 146 either one of a pair of bevel gears 147, splined to a shaft 148. This shaft has a cone pulley 149 which is belt connected with a cone pulley 150 on a parallel shaft 151. This shaft is supported at one end in a pivoted bearing 152 and at the other end in an adjustable bearing 153 by means of which a worm 154 on it may be moved into or out of mesh with a worm wheel 155. This worm wheel is affixed to a transverse shaft 156 on which is splined a gear 157. In this case the bull wheel 37 is splined on its shaft and a rock lever 158 is provided by means of which the bull wheel may be moved out of engagement with the table rack 38, the position of which is indicated by broken lines in Fig. 10, and the gear 157 moved into engagement with the rack.

It is obvious that by this arrangement the table may be reciprocated at slow speeds from the driven countershaft 81 and that its direction of travel may be reversed by means of either of the levers 142 or 146.

A worm 160 between brackets 161 on the side bracket 190 is splined to shaft 144 and engages a worm wheel 162 on the end of a shaft 163. The bevel gear 164 which is splined to this shaft is arranged to actuate the vertical shaft 165 through the double bevel gears 166 and 167, the latter engaging a bevel gear 168 on shaft 165.

Figures 13, 14, 15, 16:
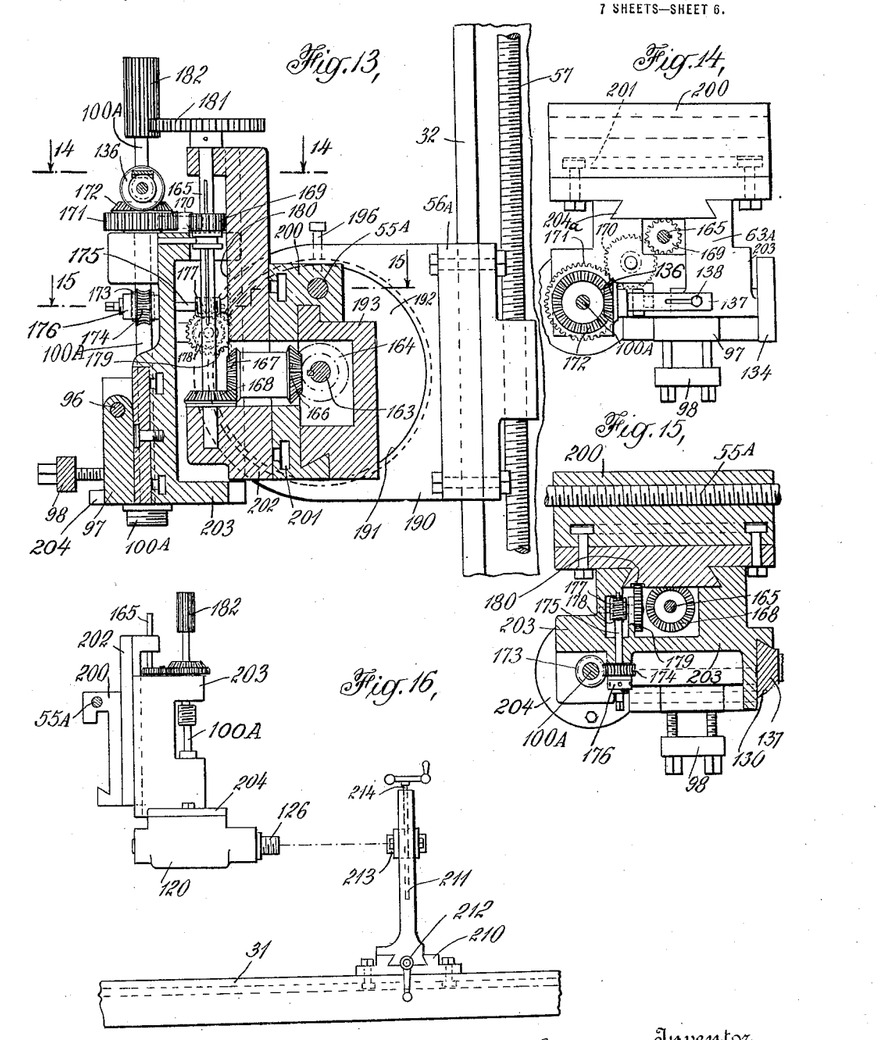
Figure 13 is a sectional side elevation on a larger scale, of the tool head of the machine shown in Figure 9, the section being taken through the line 13—13 of Figure 11.
Figure 14 is a sectional plan view taken on the line 14—14 of Figure 13.
Figure 15 is a sectional plan view taken on the irregular line 15—15 of Figure 13.
Figure 16 is a side elevation of the tool head of the machine shown in Figure 9, together with a part of the slidable table of the machine with an adjustable steady rest for a boring bar attached thereto.

169 is a gear affixed to shaft 165 and arranged to drive a gear 171 on the spindle 100$^A$ through an intermediate removable gear 170 which is shown in broken lines in Figures 13 and 14. By these parts the spindle is driven.

On the spindle 100$^A$ is a worm 173 which meshes with a worm wheel 174 loose on a shaft 175. A nut 176 is provided by means of which this worm wheel may be tightened to drive shaft 175. A worm 177 on the other end of this shaft meshes with a worm wheel 178 to drive a gear 179 in a vertical rack 180. By means of this mechanism an automatic vertical feed of the tool slide 203 in which these parts are supported, is effected, relative to the cross rail.

When a faster spindle speed or more rapid vertical feed is desired, a gear 181 is affixed to the upper end of the shaft 165, and arranged to drive a gear 182 on the upper end of the spindle. The latter gear is long enough to provide for the vertical movement of the spindle. When the gear 181 is used the intermediate gear 170 is omitted.

The slotter is arranged as in the other form. In this case its gear 136 is driven by gear 172.

The cross feed screw 55$^A$ is driven by a gear 183 near one of its ends which is in mesh with a gear 184 loosely mounted on shaft 163. A worm wheel 185 is also loosely mounted on shaft 163 and a nut 186 is provided for the purpose of tightening them together so that the gear 184 will rotate with the worm wheel 185. On a vertical shaft 187 is a splined gear 188 by means of which the worm wheel 185 is driven from power shaft 140 by means of a bevel gear arrangement designated by 189 similar to that at the other end of shaft 140 designated by the numerals 141—143, and specifically described hereinbefore.

Instead of a cross rail, brackets 190 are engaged by the vertical feed screws 57 and are arranged to slide in the side frames 32. Each bracket is constructed to form a circular pocket 191 into which pockets fit the circular ends 192 of a cross frame 193. The brackets are split at 194 and provided with tightening screws 195. Steady pins 196 are also provided to be placed in holes in the brackets and spaced radial holes in the ends 192 of the cross frame.

By this arrangement the cross frame and all of the parts it supports may be turned around and set at any desired angular position relative to the side frames 32.

The tool head support 200 is slidably mounted on the cross frame. This is constructed with an undercut circular groove 201 by means of which the tool head 202 is adjustably secured thereto. The tool slide 203 is provided with an undercut groove into which fits the guide 204$^a$ of the tool head.

Thus the tool head may be adjusted at any desired angle, and the tool slide adjusted transversely thereon. A flange 204 at the base of the tool slide is adapted to receive a housing 120 as shown in Figure 16.

This Figure 16 shows the way a boring bar support may be set up on the machine. This comprises a base 210 bolted to table 31 and slidably supporting a pedestal 211 which may be transversely adjusted by a screw 212. 213 is a bearing slidable vertically in the pedestal and adjusted therein by a screw 214. In this case a boring bar may be driven by the shaft 122, shown in Figure 4, the enlarged end 126 of which appears in this Figure 16.

Figures 17, 18, 19:
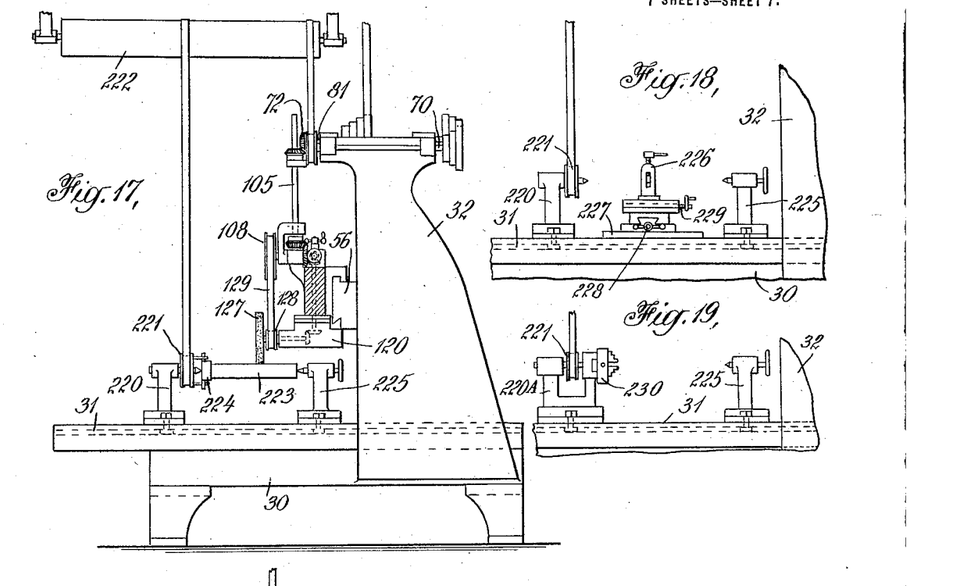
Figure 17 is a side elevation, partly in section of the machine of Figure 1, showing the manner in which it is used as a cylinder grinder.
Figure 18 is a side elevation of a part of the slidable table of the machine with head and tail centers and a slide rest affixed thereto.
Figure 19 is a view similar to Figure 18, with a lathe chuck and a tail center affixed to the slidable table.

Figure 17 shows the way the machine is set up for cylinder grinding. A head stock 220 is affixed to the table 31 and its pulley 221 belted to a cylindrical drum 222 over the machine and parallel with the direction of movement of the table, which is driven at desired speeds by a belt from pulley 72 on shaft 70.

223 is the piece to be ground, connected by clamps 224 to the head stock, the other end of which piece is supported by a tail stock 225 bolted to the table. The grinding wheel 127 is supported and driven as described before. By the slow drive mechanism for the table and the feed adjustments for the grinding wheel which have been described, the desired grinding operation may be performed.

Lathe work may be supported between the head stock 220 and the tail stock 225 and operated upon by a lathe tool in a support 226 shown in Figure 18 on a base 227 bolted to table 31 and adjustable transversely by a screw 228 and longitudinally by a screw 229.

Figure 19 shows a different form of head stock 220$^A$ which is provided with a chuck 230.

Figures 20, 21:
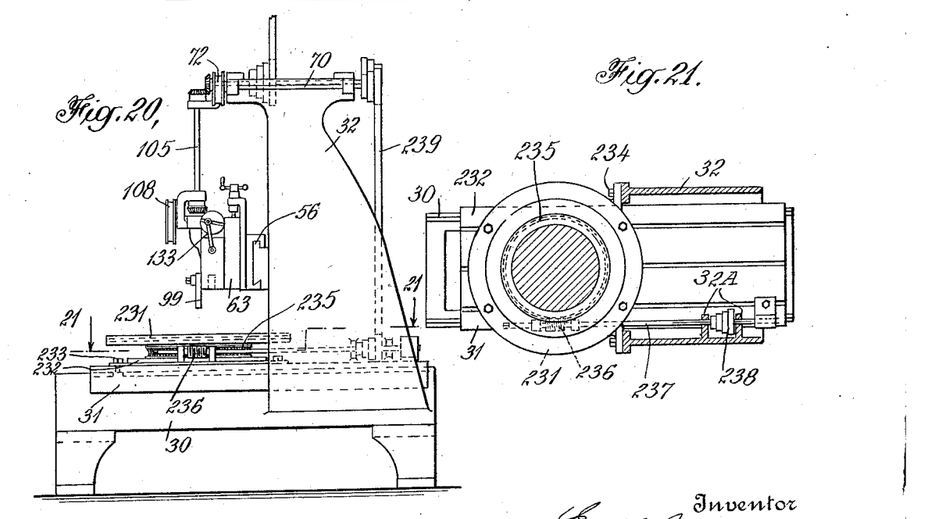
Figure 20 is a side elevation of my improved machine of the form shown in Figure 1, with a rotary table and actuating mechanism therefor attached to the slidable table.
Figure 21 is a sectional plan view of the mechanism shown in Figure 20, the section being taken on the irregular line 21—21 of Figure 20.

Figures 20 and 21 show a rotatable work support 231 which is provided as a part of this machine. This comprises a base 232 which is arranged to be bolted to the table 31 at 233 and to the side frames 32 at 234. The support 231 is rotatably supported on its base and is provided with a worm wheel 235 with which meshes a worm 236 affixed to a shaft 237 on which is splined a cone pulley 238 held against longitudinal movement by brackets 32$^A$ in alignment with the cone pulley 71 on shaft 70 with which it is to be connected by a belt 239. With this attachment the machine may be used as a boring mill and many other operations may be performed upon a piece bolted to the support 231 such as milling, cutting vertical or horizontal slots, gear cutting, surface cutting and grinding. By detaching the bolts 234 the support 231 may be reciprocated with the table 31.

Figure 6:
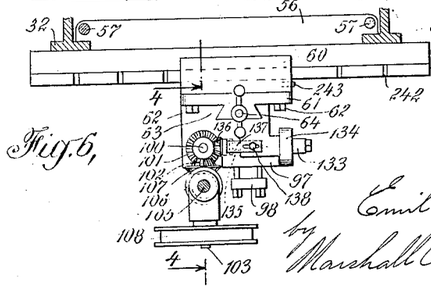
Figure 6 is a plan view of the tool head and the parts which support it, the side frames of the machine being sectioned on and the view taken from the line 6—6 of Figure 3.
Figure 9:
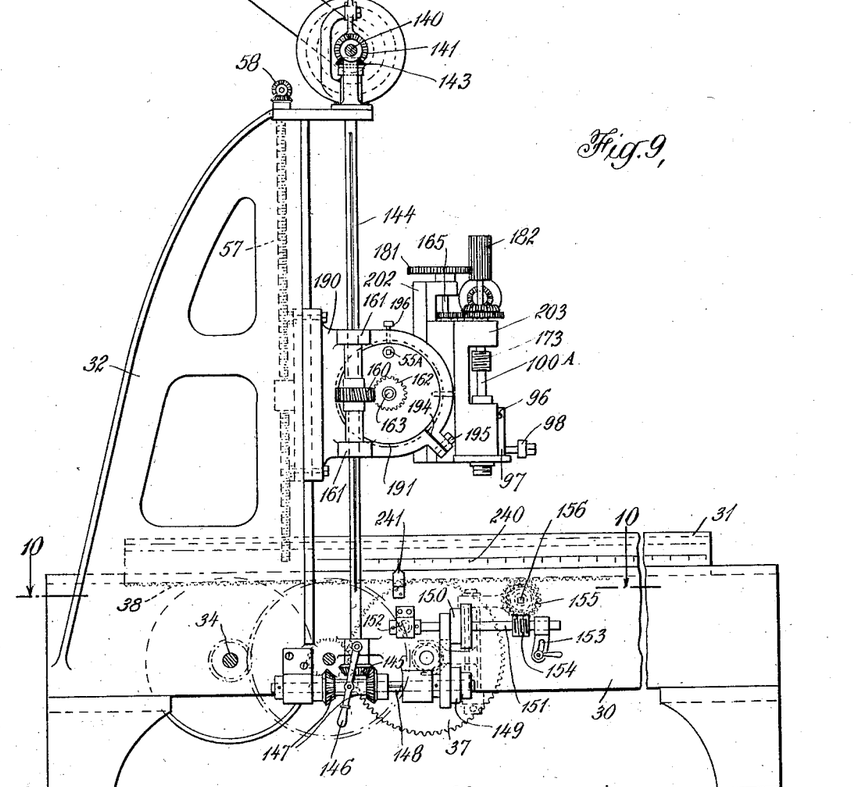
Figure 9 is a side elevation of a machine of a modified form of construction which also embodies my invention.
Figure 10:
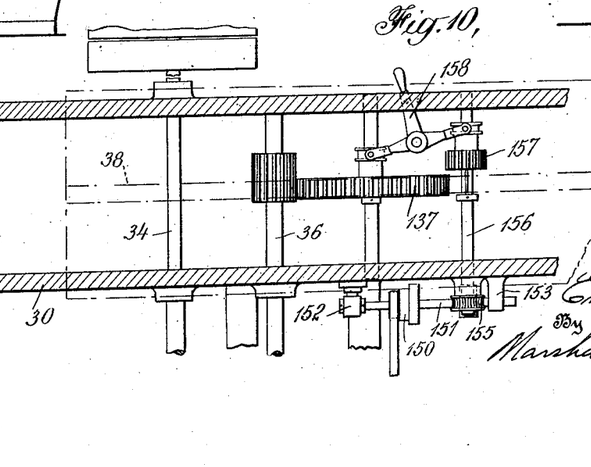
Figure 10 is a sectional plan view of the machine shown in Figure 9, the section being taken on the line 10—10 of the latter figure.
Figure 11:
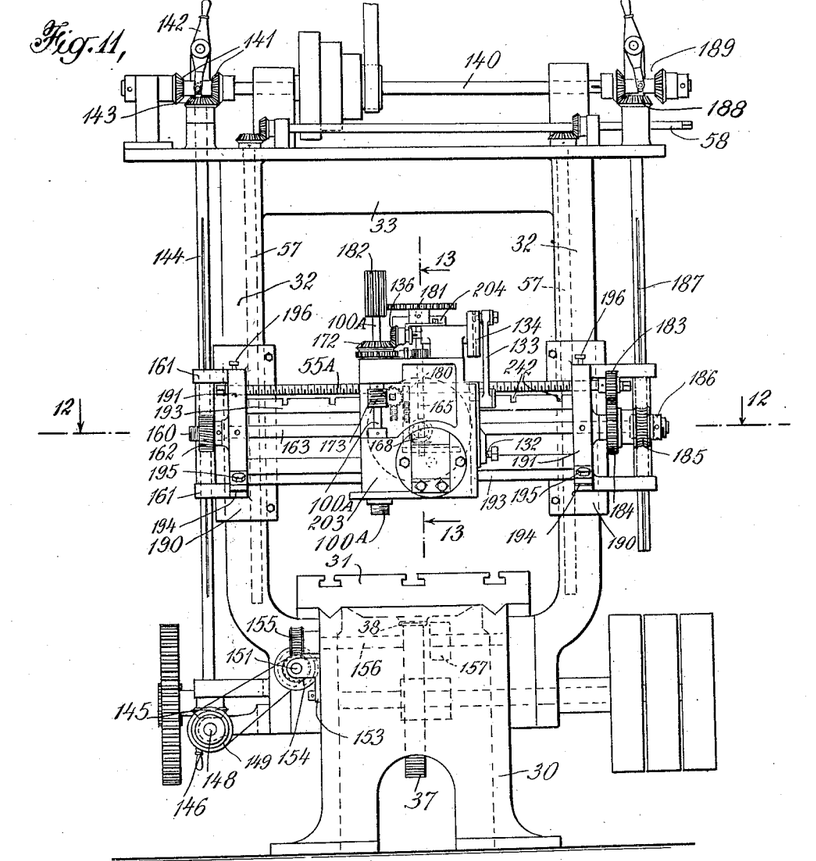
Figure 11 is a front elevation of the machine shown in Figure 9.
Figure 12:
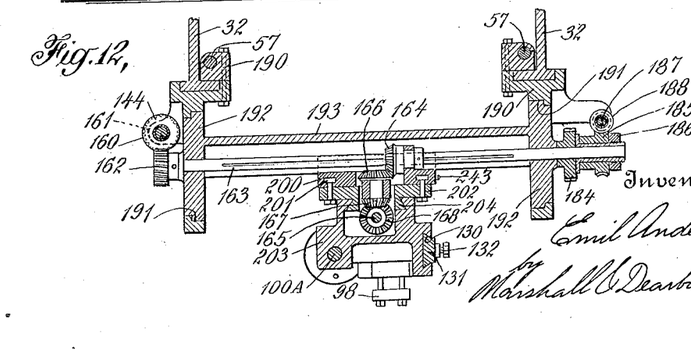
Figure 12 is a sectional plan view, taken on the line 12—12 of Figure 11.

The machine described may be used for performing an endless variety of work. It is especially desirable for use where space is limited and the variety of work to be done is great, such for example, as on ships. In order to facilitate the setting up of work, a scale 240 is provided on the side of table 31 with a cooperating index pointer 241 on the bed 30 (Figure 9). Also, equally spaced slots 242 are provided in the cross rail 56 (Figs. 3 and 6) and a michrometer adjusting screw 243 in the tool head 60 for the purpose of providing a means for taking measurements between this screw and a bar inserted in one of these slots. The cross frame 193 is provided with similar slots (Fig. 11).

The nature of this invention is such that considerable modification in design and construction may be used without departing from the spirit and scope of the invention. Structures of preferred form and construction have been illustrated and described for the purpose of showing ways in which the invention may be used, but the inventive thought upon which this application is based is broader than these illustrative embodiments thereof, and I therefore intend no limitations other than those imposed by the appended claims.

What I claim is:

1. A planer having a reciprocatory table and means for driving said table at comparatively high speed, transmission mechanism for imparting a slow movement to said table, and means for operatively connecting either said means or said transmission mechanism with the planer table.

2. A planer having a reciprocatory table and means for driving said table at comparatively high speed, and other transmission machanism comprising worm gearing for imparting a slow movement to said table.

3. A planer having a reciprocatory table, a rack on said table, a power driven shaft, a bull wheel arranged to engage said rack, spur gearing between said power driven shaft and the bull wheel, a second power driven shaft, a toothed gear arranged to engage the table rack, transmission mechanism comprising worm gearing between said second power driven shaft and said toothed gear, and means for shifting the bull wheel and the toothed gear axially into or out of engagement with the table rack.

4. A planer having a reciprocatory table, a rack on said table, a power driven shaft, a bull wheel arranged to engage said rack, spur gearing between said power driven shaft and the bull wheel, a second power driven shaft, a toothed gear arranged to engage the table rack, transmission mechanism comprising worm gearing between said second power driven shaft and said toothed gear, a pivoted lever in engagement with the bull wheel and the toothed gear arranged to shift the bull wheel and the toothed gear simultaneously in opposite axial directions to bring one or the other into engagement with the table rack.

5. In combination with a planer having a tool head, a cross feed screw and means for intermittently driving said feed screw, and driving mechanism for imparting a continuous slow rotation to said feed screw.

6. In combination with a planer having a tool head, a cross feed screw and means for intermittently driving said feed screw, driving mechanism for imparting a continuous slow rotation to said feed screw, and means for operatively connecting either said means or said driving mechanism with the feed screw.

7. In combination with a planer having a tool head, a cross feed screw and means for intermittently driving said feed screw, driving machanism comprising worm gearing for imparting a continuous slow rotation to said feed screw.

8. A planer having a cross rail, a tool head slidably mounted thereon, a cross feed screw and actuating means comprising a reciprocatory rack for imparting an intermittent rotation to said feed screw, a power driven shaft and intermediate mechanism comprising worm gearing for imparting a steady rotation to the feed screw, and means for connecting either said reciprocatory rack or said power driven shaft with the feed screw.

9. A planer having a cross rail, a tool head slidably mounted thereon, a cross feed screw and actuating means comprising a reciprocatory rack for imparting an intermittent rotation to said feed screw, a power driven shaft and intermediate mechanism comprising worm gearing for imparting a steady rotation to the feed screw, a reversible pawl for connecting said reciprocatory rack with the feed screw, and another reversible pawl for connecting said power driven shaft with the feed screw.

10. A tool yoke, a rotatable plate, a tool slide supporting said plate, means for adjustably securing said plate to the tool slide in any desired angular position throughout 180°, and a pivotal connection between said yoke and said plate at an angle to the axis of motion of said plate, whereby the plane of motion of said yoke is at an angle to the plane of motion of said plate.

11. A tool yoke, a rotatable plate, a tool slide supporting said plate, a tool head in which the tool slide is rotatively supported, means for adjustably securing the tool slide in the tool head in any desired angular position throughout 180°, means for adjustably securing said plate to the tool slide in any desired angular position, and a pivotal connection between said yoke and said plate at an angle to the axis of motion of said plate, whereby the plane of motion of said yoke is at an angle to the plane of motion of said plate.

12. A tool slide, a rotary spindle in said tool slide, means for driving said spindle, and a tool yoke pivotally supported on said tool slide, whereby said yoke may be swung at an angle to the motion of said slide.

13. A transversely movable tool head, a tool slide vertically movable thereon, a tool yoke pivotally supported on the tool slide, a rotary spindle in the tool slide, a drive shaft for the spindle, and transmission mechanism between the drive shaft and the spindle, said transmission mechanism being arranged to provide for the transverse and vertical movements of the tool slide.

14. A transversely movable tool head, a tool slide vertically movable thereon, a tool yoke pivotally supported on the tool slide, a rotary spindle in the tool slide, a drive shaft for the spindle, transmission mechanism between the drive shaft and the spindle, said transmission mechanism being arranged to provide for the transverse and vertical movements of the tool slide, guides in the tool slide, a reciprocatory tool holder in said guides, and means for actuating said tool holder from said transmission mechanism.

15. A tool head support, means for adjusting said support in desired angular position relative to a horizontal axis, a drive shaft in alignment with said horizontal axis, a tool head adjustable in relation to said support about a transverse axis, an intermediate shaft in alignment with said transverse axis, gearing between said drive shaft and said intermediate shaft, a rotary spindle, and means for operatively connecting said spindle with the intermediate shaft.

16. A tool head support, means for adjusting said support in desired angular position relative to a horizontal axis, a drive shaft in alignment with said horizontal axis, a tool head adjustable in relation to said support about a transverse axis, an intermediate shaft in alignment with said transverse axis, gearing between said drive shaft and said intermediate shaft, a tool slide adjustably supported on the tool head, a rotary spindle in said tool slide, and driving means for operatively connecting said spindle with the intermediate shaft.

17. A tool head support, means for adjusting said support in desired angular position relative to a horizontal axis, a drive shaft in alignment with said horizontal axis, a tool head adjustable in relation to said support about a transverse axis, an intermediate shaft in alignment with said transverse axis, gearing between said drive shaft and said intermediate shaft, a tool slide adjustably supported on the tool head, a rotary spindle in said tool slide, driving means for operatively connecting said spindle with the intermediate shaft, and a tool yoke pivotally connected to said tool slide.

18. A tool head support, means for adjusting said support in desired angular position relative to a horizontal axis, a drive shaft in alignment with said horizontal axis, a tool head adjustable in relation to said support about a transverse axis, an intermediate shaft in alignment with said transverse axis, gearing between said drive shaft and said intermediate shaft, a tool slide adjustably supported on the tool head, a rotary spindle in said tool slide, driving means for operatively connecting said spindle with the intermediate shaft, guides in the tool slide, a reciprocatory tool holder in said guides, and means for actuating said tool holder from said drive shaft.

19. A tool head support, means for adjusting said support in desired angular position relative to a horizontal axis, a drive shaft in alignment with said horizontal axis, a tool head adjustable in relation to said support about a transverse axis, an intermediate shaft in alignment with said transverse axis, gearing between said drive shaft and said intermediate shaft, a tool slide adjustably supported on the tool head, a rotary spindle in said tool slide, driving means for operatively connecting said spindle with the intermediate shaft, guides in the tool slide, a reciprocatory tool holder in said guides, means for actuating said tool holder from the spindle driving means, and means for connecting and disconnecting said means for actuating the tool holder with and from the spindle driving means.

20. A cross frame, means for moving said cross frame vertically, means for adjusting said frame in desired angular positions relative to a horizontal axis, a drive shaft supported in said frame in alignment with said horizontal axis, a tool head support slidably mounted on the cross frame, a rotary spindle carried on said support, and means for operatively connecting said spindle with said drive shaft.

21. A cross frame, means for moving said cross frame vertically, means for adjusting said frame in desired angular positions relative to a horizontal axis, a drive shaft supported in said frame in alignment with said horizontal axis, a tool head support slidably mounted on the cross frame, a tool head adjustable in relation to said support about a transverse axis, an intermediate shaft in alignment with said transverse axis, gearing between said drive shaft and said intermediate shaft, a rotary spindle carried on said tool head, and driving means for operatively connecting said spindle with the intermediate shaft.

22. A cross frame, means for moving said cross frame vertically, means for adjusting said frame in desired angular positions relative to a horizontal axis, a drive shaft supported in said frame in alignment with said horizontal axis, a tool head support slidably mounted on the cross frame, a tool head adjustable in relation to said support about a transverse axis, an intermediate shaft in alignment with said transverse shaft, a tool slide adjustably supported on the tool head, a rotary spindle in the tool slide, and driving means for operatively connecting said spindle with the intermediate shaft.

23. A cross frame, means for adjusting said frame in desired angular positions relative to a horizontal axis, a drive shaft supported in said frame in alignment with said horizontal axis, a tool head support slidably mounted on the cross frame, a tool head adjustable in relation to said support about a transverse axis, an intermediate shaft in alignment with said transverse shaft, a tool slide adjustably supported on the tool head, a rotary spindle in the tool slide, driving means for operatively connecting said spindle with the intermediate shaft, and a tool yoke pivotally connected to said tool slide.

24. A cross frame, means for adjusting said frame in desired angular positions relative to a horizontal axis, a drive shaft supported in said frame in alignment with said horizontal axis, a tool head support slidably mounted on the cross frame, a tool head adjustable in relation to said support about a transverse axis, an intermediate shaft in alignment with said transverse shaft, a tool slide adjustably supported on the tool head, a rotary spindle in the tool slide, driving means for operatively connecting said spindle with the intermediate shaft, guides in the tool slide, a reciprocatory tool holder in said guides, and means for actuating said tool holder from the spindle driving means.

25. A cross frame, means for adjusting said frame in desired angular positions relative to a horizontal axis, a drive shaft supported in said frame in alignment with said horizontal axis, a tool head support slidably mounted on the cross frame, a tool head adjustable in relation to said support about a transverse axis, an intermediate shaft in alignment with said transverse shaft, a tool slide adjustably supported on the tool head, a rotary spindle in the tool slide, driving means for operatively connecting said spindle with the intermediate shaft, guides in the tool slide, a reciprocatory tool holder in said guides, means for actuating said tool holder from the spindle driving means, and a tool yoke pivotally connected to said tool slide.

26. A cross frame, means for adjusting said frame in desired angular positions relative to a horizontal axis, a drive shaft supported in said frame in alignment with said horizontal axis, a tool head support slidably mounted on the cross frame, a tool head adjustable in relation to said support about a transverse axis, an intermediate shaft in alignment with said transverse shaft, a tool slide adjustably supported on the tool head, a rotary spindle in the tool slide, driving means for operatively connecting said spindle with the intermediate shaft, and means for automatically moving the tool slide on the tool head.

27. A cross frame, means for adjusting said frame in desired angular positions relative to a horizontal axis, a drive shaft supported in said frame in alignment with said horizontal axis, a tool head support slidably mounted on the cross frame, a tool head adjustable in relation to said support about a transverse axis, an intermediate shaft in alignment with said transverse shaft, a tool slide adjustably supported on the tool head, a rotary spindle in the tool slide, driving means for operatively connecting said spindle with the intermediate shaft, an automatic feed mechanism for moving the tool slide on the tool head, and means for operatively connecting said feed mechanism with said spindle driving means.

28. A cross frame, means for adjusting said frame in desired angular positions relative to a horizontal axis, a drive shaft supported in said frame in alignment with said horizontal axis, a cross feed screw supported in said frame parallel with the drive shaft, gears arranged to connect said drive shaft, and feed screw, a tool head support in engagement with the feed screw, slidably mounted on the cross frame, a rotary spindle carried on said support, and means for operatively connecting said spindle with said drive shaft.

29. A cross frame, means for adjusting said frame in desired angular positions relative to a horizontal axis, a drive shaft supported in said frame in alignment with said horizontal axis, a cross feed screw supported in said frame parallel with the drive shaft, gears arranged to connect said drive shaft and feed screw, means for controlling the operative connection of said gears, a tool head support in engagement with the feed screw, slidably mounted on the cross frame, a rotary spindle carried on said support, and means for operatively connecting said spindle with said drive shaft.

30. A cross frame, means for adjusting said frame in desired angular positions relative to a horizontal axis, a drive shaft supported in said frame in alignment with said horizontal axis, a cross feed screw supported in said frame parallel with the drive shaft, gears arranged to connect said drive shaft and feed screw, a tool head support in engagement with the feed screw, slidably mounted on the cross frame, a tool head adjustable in relation to said support about a transverse axis, an intermediate shaft in alignment with said intermediate axis, gearing between said drive shaft and said intermediate shaft, a rotary spindle on said tool head, and driving means for operatively connecting said spindle with the intermediate shaft.

31. A cross frame, means for adjusting said frame in desired angular positions relative to a horizontal axis, a drive shaft supported in said frame in alignment with said horizontal axis, a cross feed screw supported in said frame parallel with the drive shaft, gears arranged to connect said drive shaft and feed screw, a tool head support in engagement with the feed screw, slidably mounted on the cross frame, a tool head adjustable in relation to said support about a transverse axis, an intermediate shaft in alignment with said intermediate axis, gearing between said drive shaft and said intermediate shaft, a tool slide adjustably supported on the tool head, a rotary spindle in the tool slide, and driving means for operatively connecting said spindle with the intermediate shaft.

32. A cross frame, means for adjusting said frame in desired angular positions relative to a horizontal axis, a drive shaft supported in said frame in alignment with said horizontal axis, a cross feed screw supported in said frame parallel with the drive shaft, gears arranged to connect said drive shaft and feed screw, a tool head support in engagement with the feed screw, slidably mounted on the cross frame, a tool head adjustable in relation to said support about a transverse axis, an intermediate shaft in alignment with said intermediate axis, gearing between said drive shaft and said intermediate shaft, a tool slide adjustably supported on the tool head, a rotary spindle in the tool slide, driving means for operatively connecting said spindle with the intermediate shaft, guides in the tool slide, a reciprocatory tool holder in said guides, and means for actuating said tool holder from the spindle driving means.

33. A cross frame, means for adjusting said frame in desired angular positions relative to a horizontal axis, a drive shaft supported in said frame in alignment with said horizontal axis, a cross feed screw supported in said frame parallel with the drive shaft, gears arranged to connect said drive shaft and feed screw, a tool head support in engagement with the feed screw, slidably mounted on the cross frame, a tool head adjustable in relation to said support about a transverse axis, an intermediate shaft in alignment with said intermediate axis, gearing between said drive shaft and said intermediate shaft, a tool slide adjustably supported on the tool head, a rotary spindle in the tool slide, driving means for operatively connecting said spindle with the intermediate shaft, an automatic feed mechanism for moving the tool slide on the tool head, and means for operatively connecting said feed mechanism with said spindle driving means.

34. A cross frame, means for adjusting said frame in desired angular positions relative to a horizontal axis, a drive shaft supported in said frame in alignment with said horizontal axis, a cross feed screw supported in said frame parallel with the drive shaft, gears arranged to connect said drive shaft and feed screw, a tool head support in engagement with the feed screw, slidably mounted on the cross frame, a tool head adjustable in relation to said support about a transverse axis, an intermediate shaft in alignment with said intermediate axis, gearing between said drive shaft and said intermediate shaft, a tool slide adjustably supported on the tool head, a rotary spindle in the tool slide, driving means for operatively connecting said spindle with the intermediate shaft, guides in the tool slide, a reciprocatory tool holder in said guides, means for actuating said tool holder from the spindle driving means, an automatic feed mechanism for moving the tool slide on the tool head, and means for operatively connecting said feed mechanism with said spindle driving means.

35. Vertical side frames, brackets slidably mounted thereon, a cross frame rotatably mounted in said brackets, means for adjusting said frame in desired angular positions relative to a horizontal axis, a drive shaft supported in said frame in alignment with said horizontal axis, a cross feed screw supported in said frame parallel with the drive shaft, gears arranged to connect said drive shaft and feed screw, a tool head support in engagement with the feed screw, slidably mounted on the cross frame, a rotary spindle carried on said support, and means for operatively connecting said spindle with said drive shaft.

36. Vertical side frames, brackets slidably mounted thereon, a cross frame rotatably mounted in said brackets, means for adjusting said frame in desired angular positions relative to a horizontal axis, a drive shaft supported in said frame in alignment with said horizontal axis, a cross feed screw supported in said frame parallel with the drive shaft, gears arranged to connect said drive shaft and feed screw, a tool head support in engagement with the feed screw, slidably mounted on the cross frame, a tool head adjustable in relation to said support about a transverse axis, an intermediate shaft in alignment with said intermediate axis, gearing between said drive shaft and said intermediate shaft, a rotary spindle on said tool head, and driving means for operatively connecting said spindle with the intermediate shaft.

37. Vertical side frames, brackets slidably mounted thereon, a cross frame rotatably mounted in said brackets, means for adjusting said frame in desired angular positions relative to a horizontal axis, a drive shaft supported in said frame in alignment with said horizontal axis, a cross feed screw supported in said frame parallel with the drive shaft, gears arranged to connect said drive shaft and feed screw, a tool head support in engagement with the feed screw, slidably mounted on the cross frame, a tool head adjustable in relation to said support about a transverse axis, an intermediate shaft in alignment with said intermediate axis, gearing between said drive shaft and said intermediate shaft, a tool slide adjustably supported on the tool head, a rotary spindle in the tool slide, and driving means for operatively connecting said spindle with the intermediate shaft.

38. Vertical side frames, brackets slidably mounted thereon, a cross frame rotatably mounted in said brackets, means for adjusting said frame in desired angular positions relative to a horizontal axis, a drive shaft supported in said frame in alignment with said horizontal axis, a cross feed screw supported in said frame parallel with the drive shaft, gears arranged to connect said drive shaft and feed screw, a tool head support in engagement with the feed screw, slidably mounted on the cross frame, a tool head adjustable in relation to said support about a transverse axis, an intermediate shaft in alignment with said intermediate axis, gearing between said drive shaft and said intermediate shaft, a tool slide adjustably supported on the tool head, a rotary spindle in the tool slide, driving means for operatively connecting said spindle with the intermediate shaft, an automatic feed mechanism for moving the tool slide on the tool head, and means for operatively connecting said feed mechanism with said spindle driving means.

39. In combination with a planer having a transversely movable tool head support, a tool head adjustably secured thereto, a tool slide movably mounted on said tool head, a tool yoke pivotally connected with said tool slide, a rotary spindle in the tool slide, and a table; a rotary work support comprising a base arranged to be secured to said table, and means for rotating said work support.

40. In combination with a planer having a transversely movable tool head support, a tool head adjustably secured thereto, a tool slide movably mounted on said tool head, guides on the tool slide, a reciprocatory tool holder in said guides, and a table; a rotary work support comprising a base arranged to be secured to said table, and means for rotating said work support.

41. In combination with a planer having a transversely movable tool head support, a tool head adjustably secured thereto, a tool slide movably mounted on said tool head, a rotary spindle in the tool slide, guides on the tool slide, a reciprocatory tool holder in said guides, and a table; a rotary work support comprising a base arranged to be secured to said table, and means for rotating said work support.

42. In a combination with a planer having a transversely movable tool head support, a tool head adjustably secured thereto, a tool slide movably mounted on said tool head, a rotary spindle in the tool slide, guides on the tool slide, a reciprocatory tool holder in said guides, a tool yoke pivotally connected with said tool slide, and a table; a rotary work support comprising a base arranged to be secured to said table, and means for rotating said work support.

In witness whereof, I have hereunto set my hand this 29 day of June, 1918.

EMIL ANDERSON.